UNITED STATES PATENT OFFICE.

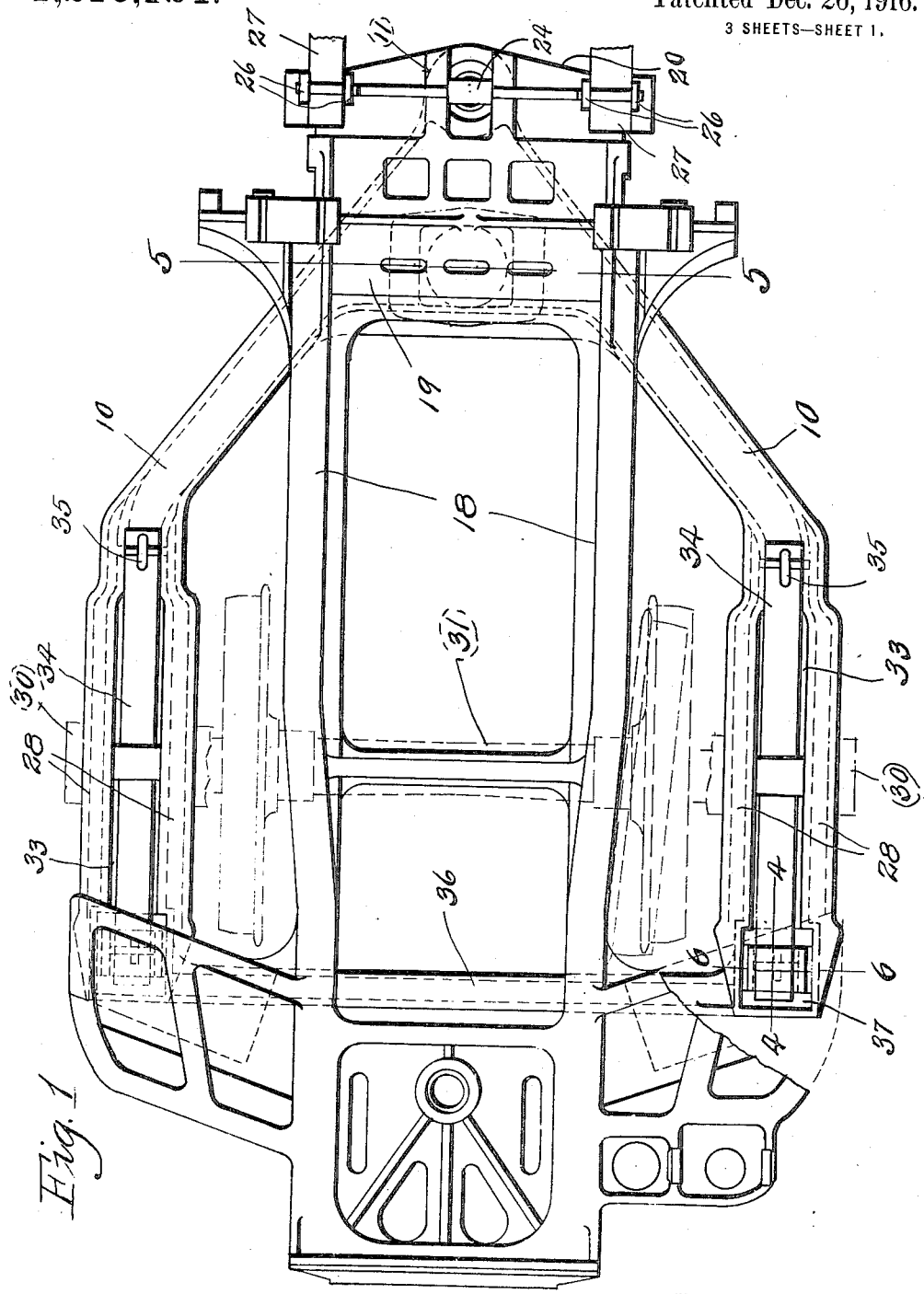

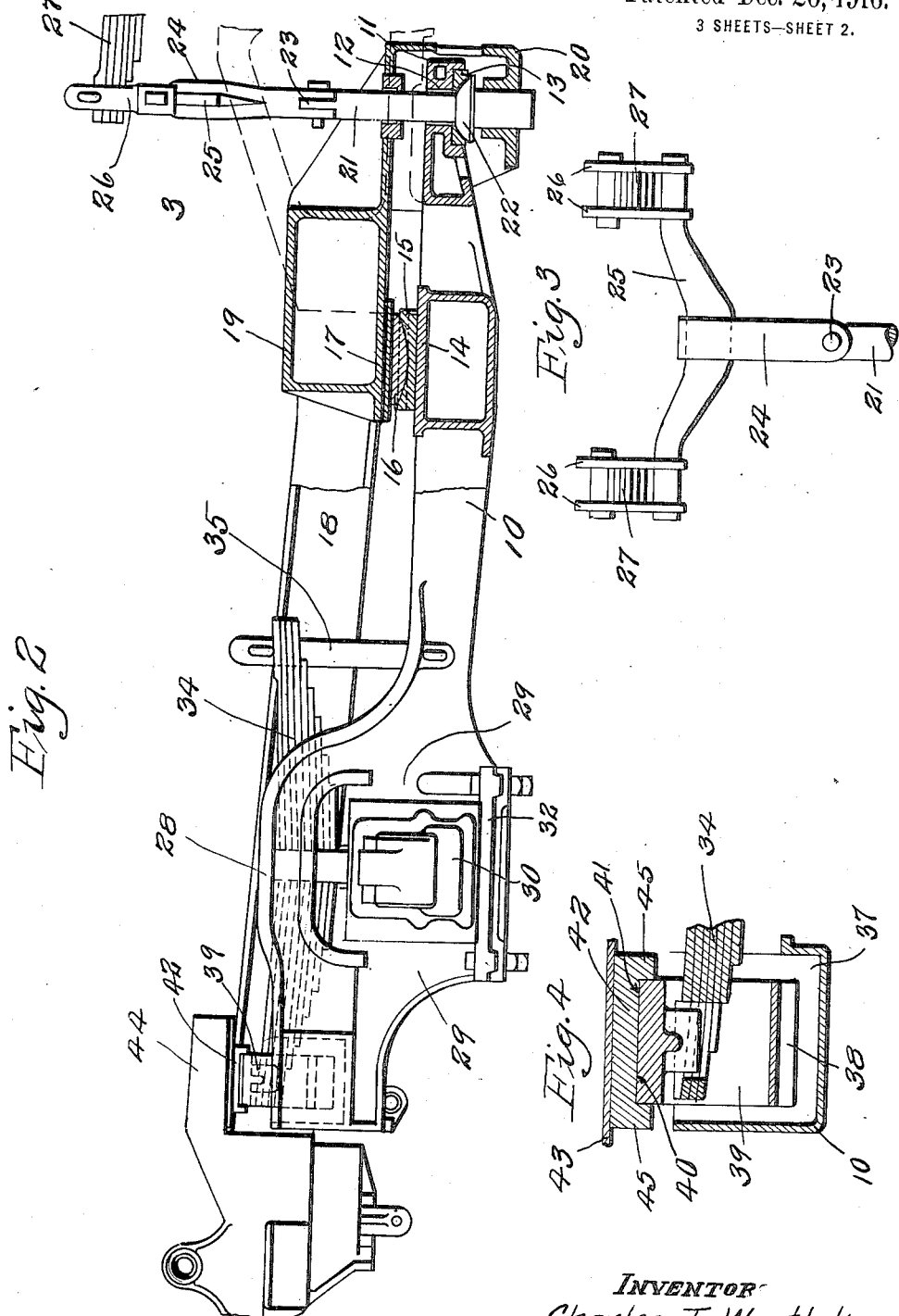

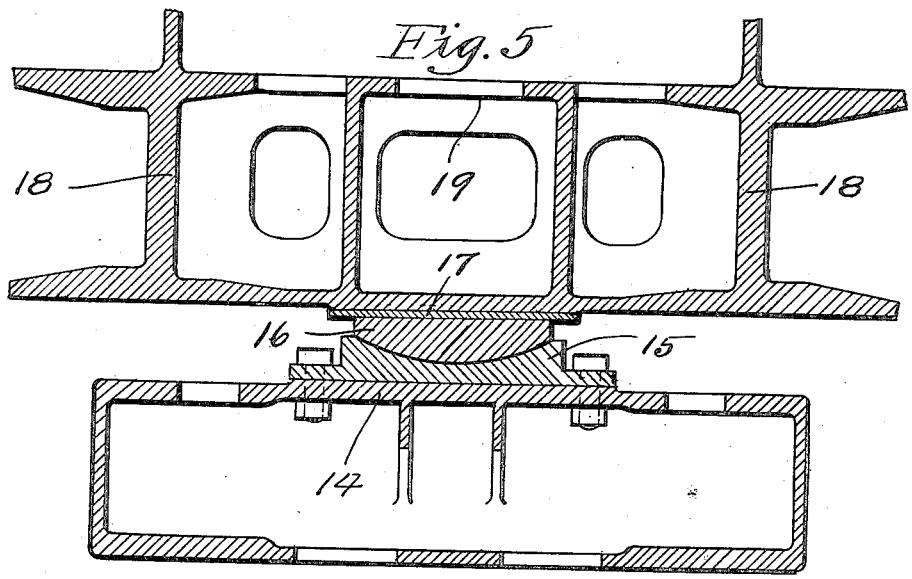
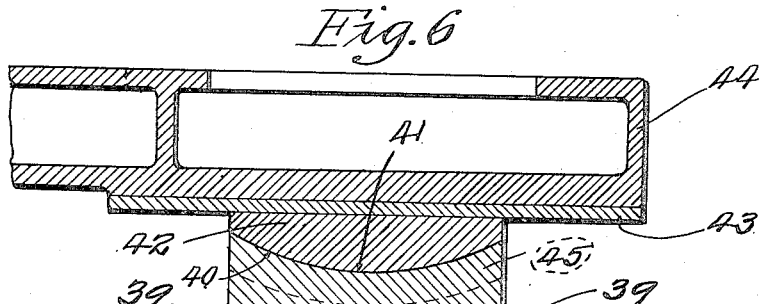
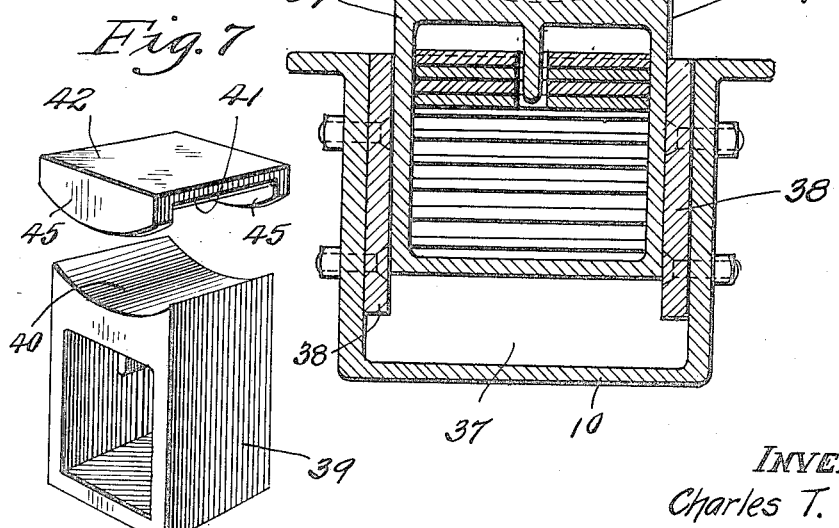

CHARLES T. WESTLAKE AND CHARLES F. FREDE, OF ST. LOUIS, MISSOURI, ASSIGNORS TO COMMONWEALTH STEEL COMPANY, OF ST. LOUIS, MISSOURI, A CORPORATION OF NEW JERSEY.

TRAILER-TRUCK FOR LOCOMOTIVES.

1,210,124. Specification of Letters Patent. Patented Dec. 26, 1916.

Application filed August 7, 1916. Serial No. 113,564.

*To all whom it may concern:*

Be it known that we, CHARLES T. WESTLAKE and CHARLES F. FREDE, citizens of the United States, residing at St. Louis, Missouri, have invented a certain new and useful Improvement in Trailer-Trucks for Locomotives, of which the following is a full, clear, and exact description, such as will enable others skilled in the art to which it appertains to make and use the same, reference being had to the accompanying drawings, forming part of this specification.

Our invention relates generally to trailer trucks for locomotives and particularly that type of trailer truck disclosed in Patent No. 1,160,874, issued to our assignee November 16, 1915, the principal objects of our invention being to generally improve upon and simplify the construction of the truck disclosed in said patent and other existing types of trailer trucks; to provide improved means for pivotally connecting and supporting the forward portion of the trailer truck frame from the locomotive frame; and to provide means for supporting the locomotive frame upon the rear portion of the trailer truck frame so that each side of the latter is free to move vertically independent of the other side, thus producing a construction which has great flexibility, which attribute is very desirable in structures of the character to which our invention relates.

With the foregoing and other objects in view, our invention consists in certain novel features of construction and arrangement of parts, hereinafter more fully described, claimed and illustrated in the accompanying drawings, in which—

Figure 1 is a plan view of a trailer truck of our improved construction, the same being associated with a portion of the locomotive frame or cradle. Fig. 2 is a side elevational view of the trailer truck frame and a portion of the locomotive frame, parts of both frames being illustrated in vertical section. Fig. 3 is an elevational view of the parts seen looking in the direction indicated by the arrow 3, Fig. 2. Fig. 4 is an enlarged vertical section taken approximately on the line 4—4 of Fig. 1. Fig. 5 is an enlarged cross sectional view taken approximately on the line 5—5 of Fig. 1. Fig. 6 is an enlarged section taken approximately on the line 6—6 of Fig. 1. Fig. 7 is a perspective view of a spring shackle and bearing forming a part of the supporting means for the locomotive frame at the rear end of the trailer truck frame.

As illustrated in the accompanying drawings, the frame of our improved trailer truck is formed in a single piece, preferably by casting, although, it will be readily understood, that if desired the frame can be of assembled or built-up construction.

The frame includes a pair of side members 10 which may be flanged, hollow or of any suitable cross sectional shape, the forward portions of which side members converge and unite at their forward ends to form a bearing member 11. Formed through said bearing member is a vertically disposed opening 12 and located on the underside of said bearing member around said opening is a bearing ring 13, preferably of hardened metal, the underside of which is concave.

Formed integral with or fixed to the forward portions of the side members 10 and slightly to the rear of bearing member 11 is a transversely disposed plate 14 on top of which is fixed a plate 15, preferably of hardened metal, the top of which is concave. Positioned on top of this plate 15 is a friction pad 16, the underside of which is convex so as to fit snugly within the concavity within the plate 15. The top of this friction pad is smooth and flat and bears against the smooth flat undersurface of a wear plate 17, preferably of hardened metal which is applied to the underside of a portion of the locomotive frame or cradle.

In the accompanying drawings, we have illustrated our improved trailer truck frame associated with a locomotive frame or cradle which is cast in one piece, said frame including a pair of side members 18, a transverse member 19, to the underside of which the wear plate 17 is applied and a substantially hollow front end member 20 in which bearing member 11 of our improved truck frame is positioned. The forward end of the truck frame is pivotally and flexibly connected to the locomotive frame by means of a vertically disposed bolt or king pin 21, the same passing through suitable openings in the locomotive frame member 20, and through the opening 12 in bearing member 11. Formed integral with or fixed to this pin or bolt is a disk 22 having a convex upper face which fits snugly within the concavity in the underside of bearing ring 13. The opening 12 in bearing member 11 is slightly larger in diameter than the pin or bolt 21, thus permitting the rear portion of the trailer truck frame to swing vertically as well as horizontally with respect to its pivotal point and the flexibility thus provided for is augmented inasmuch as the pivot pin or bolt 22 is adapted to move for a limited distance vertically through the opening in the locomotive frame member 20, with the result that the point of bearing between pin 21 and the forward end of the truck frame can shift its position vertically independently of the locomotive frame.

Thus, it will be seen that the trailer truck frame is connected to the locomotive frame so as to be pulled forward thereby at the point of pivotal connection between the frames while the load is applied to the truck frame at points to the rear of said pivot point. In this respect, the present construction differs from the construction disclosed in the patent above mentioned, in that the patented construction provides for the supporting of the trailer truck frame at its extreme forward end, and said frame is loaded, pivots, and is hauled forward by a bearing or connection located to the rear of the forward support.

The upper end of pin 21 is connected by a hinge or pivot 23 having a horizontal axis to the lower end of a hanger member 24, the upper end of which is connected to a transverse bar 25. The ends of this bar are engaged by the lower ends of shackles 26, the same depending from the locomotive springs 27, and by virtue of such construction, the pivot pin 21 serves as a portion of the front hanger for the trailer truck.

The rear ends of side members 10 are arched as designated by 28 to provide pairs of vertically disposed pedestal jaws 29 which receive the usual journal boxes 30 for the trailer truck axle 31. The lower portions of these pedestal jaws are tied to each other in any suitable manner, preferably by means of horizontally disposed plates 32.

The arched portions 28 above the journal box openings are divided to form longitudinally disposed pockets 33 which receive the semi-elliptic springs 34 which bear at their centers upon the journal boxes 30 and the forward ends of said springs are connected to the side members 10 in front of the journal box openings by suitable hangers 35.

The ends of a rail 36 are formed integral with or fixed to the rear ends of the side members 10 and formed in the rear portions of said side members adjacent to the ends of said rail 36 are vertically disposed pockets 37, the same communicating with the pockets 33 which receive springs 34.

Rigidly fixed to the inner faces of the walls at the sides of these pockets 37 are wear plates 38, preferably of hardened metal and bearing thereagainst are the vertically disposed side members of rectangular loops or shackles 39, which inclose the rear ends of springs 34. The top surfaces of these shackles 39 are provided with bearing surfaces 40 which are transversely curved and fitting snugly thereupon are the transversely curved bearing faces 41 of bearing members 42. These bearing members are provided with flat upper faces which bear against the flat underfaces of bearing plates 43, which latter are fixed in any suitable manner to brackets 44 which extend laterally from the side members 18 of the locomotive frame.

Formed integral with the front and rear ends of bearing plates 42 are depending flanges 45 which overlie the upper ends of the shackles 39.

By virtue of the construction just described, the rear portion of the locomotive frame is yieldingly supported upon the rear portions of springs 34, and each side of the trailer truck frame is free to move vertically independent of the other side.

The bearing members 42 serve as friction pads inasmuch as their flat upper faces engage the flat underfaces of plates 43, and by providing said bearing members with transversely curved underfaces, either side of the trailer truck frame can move vertically independent of the other side, during which movement the bearing members will rock slightly upon the upper ends of the shackles 39, and at the same time the shackles are held in proper operative position with respect to said bearing members 42, and with respect to the springs on which said shackles are mounted.

A trailer truck of our improved construction is comparatively simple, can be easily and cheaply manufactured, and when cast in a single piece, combines strength and rigidity. The connection between the forward end of the truck frame and the locomotive frame in addition to serving as the pivot point for the truck frame, forms a front hanger therefor, and the load is applied at points to the rear of the pivotal point. By our particular construction of bearings at the rear ends of the truck springs, independent vertical movement of the sides of the truck frame is permitted, thereby materially increasing the flexibility between the trailer truck and locomotive frame or cradle.

It will be readily understood that minor changes in the size, form and construction of the various parts of our improved trailer truck can be made and substituted for those herein shown and described, without departing from the spirit of our invention, the scope of which is set forth in the appended claims.

We claim:

1. The combination with a locomotive frame, of a trailer truck frame, a combined hanger and pivot between the forward end of said truck frame and locomotive frame, and flexible bearings between the rear portions of the trailer truck frame and locomotive frame, parts of which bearings are transversely curved with respect to the longitudinal axis of the trailer truck frame so as to permit independent vertical movement of the sides of the trailer truck frame.

2. The combination with a locomotive frame, of a trailer truck frame, a combined hanger and pivot between the forward end of the trailer truck frame and locomotive frame, a combined bearing, and friction pad between said frames to the rear of the combined hanger and pivot, flexible bearings between the rear portion of the trailer truck frame and locomotive frame, which flexible bearings permit independent vertical movement of the sides of said trailer truck frame.

3. The combination with a locomotive frame, of a trailer truck frame, a combined hanger and pivot between the forward end of the trailer truck frame and locomotive frame, and combined flexible bearings and friction pads between the rear portion of the trailer truck frame and locomotive frame.

4. The combination with a locomotive frame and trailer truck frame, which latter is pivotally connected to the locomotive frame at its forward end, of flexible bearings between the rear end of the trailer truck frame and the locomotive frame, parts of which bearings are transversely curved with respect to the longitudinal axis of the trailer truck frame so as to permit independent vertical movement of the sides of said truck frame.

5. The combination with a locomotive frame, of a trailer truck frame, a pivot pin connecting the forward end of the trailer truck frame with the locomotive frame, and flexible connections between said pivot pin and certain of the locomotive springs.

6. The combination with a locomotive frame, of a trailer truck frame, a pivot pin connecting the forward end of the trailer truck with the locomotive frame, flexible connections between said pivot pin and certain of the locomotive springs, and bearings between the frames to the rear of the pivot pin.

7. The combination with a locomotive frame, of a trailer truck frame, a pivot pin connecting the forward end of the trailer truck frame with the locomotive frame, flexible connections between said pivot pin and certain of the locomotive springs, and flexible bearings between the rear portion of the trailer truck frame and the locomotive frame, which last mentioned bearings permit independent movement of the sides of the trailer truck frame.

8. The combination with a locomotive frame, of a trailer truck frame, which latter is pivotally connected at its forward end to the locomotive frame, springs on the rear portion of the trailer truck frame, shackles on the rear portions of said springs, bearing plates on top of said shackles, which bearing plates serve as supports for parts of the locomotive frame, and the contacting faces of said shackles and bearing plates being transversely curved.

9. The combination with a locomotive frame, of a trailer truck frame, which latter is pivotally connected at its forward end to the locomotive frame, springs on the rear portion of the trailer truck frame, shackles on the rear portions of said springs, friction pads between the tops of said shackles and parts of the locomotive frame, the contacting faces between said friction pads and shackles being transversely curved.

10. The combination with a locomotive frame, of a trailer truck frame, a combined hanger and pivot between the forward end of the trailer truck frame and locomotive frame, a friction pad bearing between the frames to the rear of the combined hanger and pivot, and a pair of combined flexible bearings and friction pads between the rear portions of the trailer truck frame and the locomotive frame, which pair of bearings are constructed so as to permit independent vertical movement of the sides of the trailer truck frame.

11. The combination with a locomotive frame, of a pivot pin yieldingly supported upon said frame, and a trailer truck frame having a ball and socket connection with said pivot pin.

12. The combination with a locomotive frame and locomotive springs, of a pivot pin suspended from said springs and having a bearing in the locomotive frame, and a trailer truck frame having a ball and socket connection with said pivot pin.

13. The combination with a locomotive frame and locomotive springs, of a pivot pin suspended from said springs and having a bearing in the locomotive frame, a trailer truck frame having a ball and socket connection with said pivot pin, bearings between the locomotive frame and trailer truck frame to the rear of the pivot pin, and yielding bearings between the rear portion of the trailer truck frame and locomotive frame.

In testimony whereof we hereunto affix our signatures in the presence of two witnesses, this 31st day of July, 1916.

CHARLES T. WESTLAKE.
CHARLES F. FREDE.

Witnesses:
FRED W. DIECKMANN,
M. I. ATTERBURY.